R. J. WHEATLEY.
Subsoil Plow.
No. 62,243.
Patented Feb. 19, 1867.
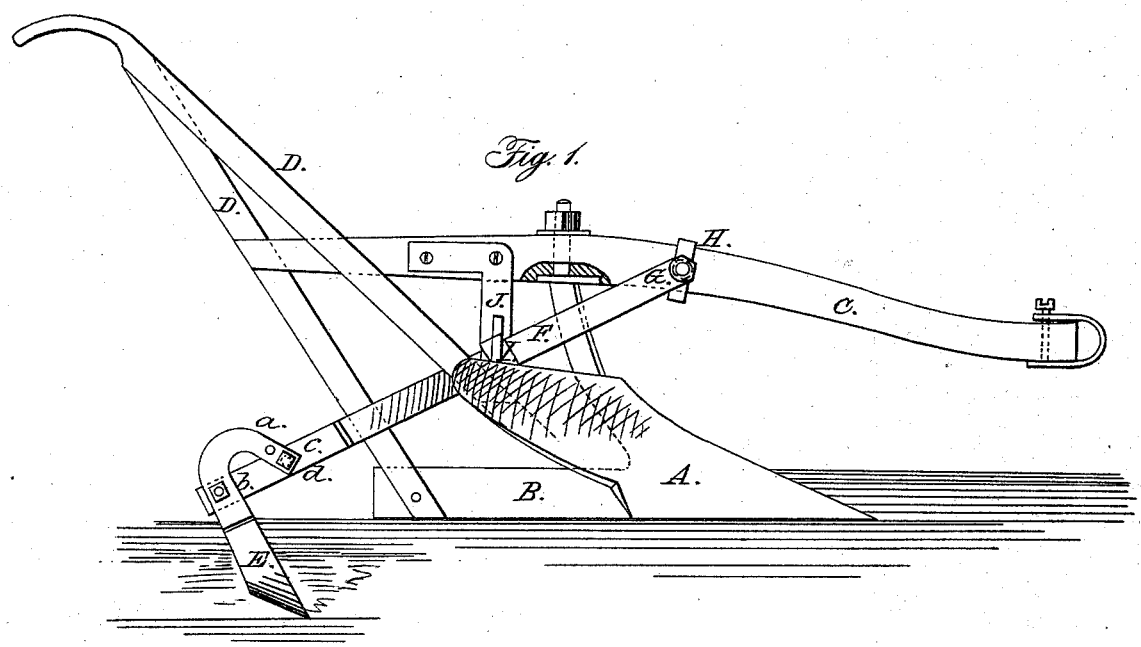
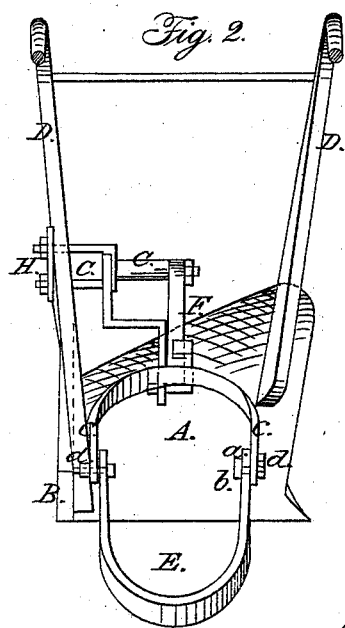
Witnesses:
Inventor:

United States Patent Office.

R. J. WHEATLEY, OF ST. JOHNS, ILLINOIS.

Letters Patent No. 62,243, dated February 19, 1867.

IMPROVEMENT IN PLOUGHS.

*The Schedule referred to in these Letters Patent and making part of the same.*

TO ALL WHOM IT MAY CONCERN:

Be it known that I, R. J. WHEATLEY, of St. Johns, in the county of Perry, and State of Illinois, have invented a new and improved Subsoil Attachment for Ploughs; and I do hereby declare that the following is a full, clear, and exact description thereof, which will enable others skilled in the art to make and use the same, reference being had to the accompanying drawings, forming part of this specification.

The object of this invention is to obtain a simple and efficient attachment for ploughs which will pulverize, loosen, or lighten up the soil at the bottom of a furrow made by the plough, and still not increase the draught of the plough to such a degree as to prevent a team from operating or drawing it with facility when the attachment is set to penetrate into the earth at its greatest depth.

Figure 1 is a side view of my invention.
Figure 2, a rear view of the same.
Similar letters of reference indicate like parts.

A represents the mould-board, B the land-side, C the beam, and D D the handles of a plough, all constructed and arranged in the ordinary or any proper manner. E represents the subsoil attachment, which is of semi-circular shape and of oblique or inclined form in its central transverse section, the whole being similar to a narrow scoop. The ends of this subsoil attachment are curved in semicircular form, as shown at $a$ in fig. 1, and they are connected by pivot bolts, $b$, to the ends of the prongs $c$ of a bar, F, and the subsoil share may have a greater or less degree of inclination given it by means of bolts $d$ which pass through the ends of the curved parts $a$ and through the prongs $c$, two or more holes being made in each part, $a$, through any of which the bolts $d$ may pass. This will be fully understood by referring to fig. 1. The bar F has its front end fitted loosely on a horizontal arm, G, which projects at right angles from the beam C, being attached thereto by a clip, H. By this arrangement the subsoil attachment may be adjusted higher or lower, according to the depth it is required to penetrate into the earth at the bottom of the furrow made by the plough. The subsoil attachment may be secured at the point desired by having a bolt, I, which projects laterally from the bar F, pass through a slotted pendent bar, J, attached to the beam C. The device is extremely simple and efficient, may be applied at a small cost to any plough, and will loosen or lighten up the earth at the bottom of the furrow in a very efficient manner, and with but a moderate application of draught power, as the earth is raised up and broken or loosened and allowed to pass through it as the plough is drawn along.

Having thus described my invention, I claim as new, and desire to secure by Letters Patent—

A subsoil attachment for ploughs, constructed, arranged, and applied to admit of being adjusted at a greater or less degree of inclination, and also adjusted higher or lower, to penetrate the earth at a greater or less depth, as may be required, substantially as herein shown and described.

R. J. WHEATLEY.

Witnesses:
N. SIMONS,
R. A. WHEATLEY.